Dec. 19, 1950 — J. L. BOYER ET AL — 2,534,754
CONTROL CIRCUIT
Filed Oct. 31, 1945 — 2 Sheets-Sheet 2

INVENTORS
John L. Boyer and
William E. Pokala
BY F. W. Lyle
ATTORNEY

Patented Dec. 19, 1950

2,534,754

UNITED STATES PATENT OFFICE 2,534,754

CONTROL CIRCUIT

John L. Boyer, Wilkinsburg, and William E. Pakala, Forest Hills, Pa., assignors to Westinghouse Electric Corporation, East Pittsburgh, Pa., a corporation of Pennsylvania Application October 31, 1945, Serial No. 625,908

12 Claims. (Cl. 321—56)

This invention relates to an electronic control circuit, and it has particular relation to a circuit for use in supplying a load with single-phase current from a source of polyphase alternating voltage.

In the usual resistance welding machine circuit, the welding transformer is supplied with a single-phase current taken from a single phase of the supply system. Since the supply system is ordinarily a three-phase system, such an arrangement is disadvantageous in that an unbalanced load is taken from the three-phase supply system. In addition, the peak KVA demand is high and the power factor is very low on the supply phase.

More recent circuits have been developed in attempts to take a balanced load from the three-phase power supply. In a typical circuit, current from the polyphase supply system is first rectified. The rectified current is then supplied alternately through different halves of a center-tapped primary winding of the welding transformer, the current through one half of the primary winding being opposite in direction to that subsequently supplied through the other half. By this arrangement, a single-phase low frequency current output is obtained from the secondary winding of the welding transformer. Such a system has certain advantages including those attributable to a low frequency but it encounters commutation difficulties and has the disadvantage of requiring a center tap on the primary winding of the welding transformer. Consequently, the transformer copper is not utilized to the highest extent.

It is, accordingly, an object of our invention to provide a new and improved control system for use in supplying a single-phase current to a load from a source of polyphase alternating voltage.

A further object of our invention is to provide a new and improved control system for use in supplying a load with single-phase current of one frequency from a source of polyphase alternating voltage of a different frequency.

Another object of our invention is to provide a new and improved control system for use in supplying a relatively low frequency single-phase current to a welding transformer from a source of higher frequency polyphase alternating voltage.

A still further object of our invention is to provide a new and improved control system for use in supplying a very low power factor load with a single-phase low frequency current from a source of higher frequency polyphase alternating voltage.

In accordance with our invention, a pair of unidirectional electric valves are provided for each phase of the source voltage. Each pair of valves is connected in inverse parallel-circuit relation with each other and in series with the corresponding phase of the source and the load, which may be the primary winding of a welding transformer. It follows that load current in one direction may be conducted only through a first valve of each pair and load current in the opposite direction may be conducted only through a second valve of each pair. Control means are then provided for causing the first valves of the pairs to be conductive to effect a load current in said one direction during a predetermined first time interval and said second valves to be conductive to effect a load current in the opposite direction during a predetermined second time interval following the first interval. Thus, a low frequency single-phase current is supplied through the load and the frequency may be varied by varying the first and second time intervals.

The features of our invention which we consider novel are set forth with more particularity in the appended claims. The invention itself, however, together with additional objects and advantages thereof may be better understood from the following description of specific embodiments thereof when read in connection with the accompanying drawings in which:

Figure 1:
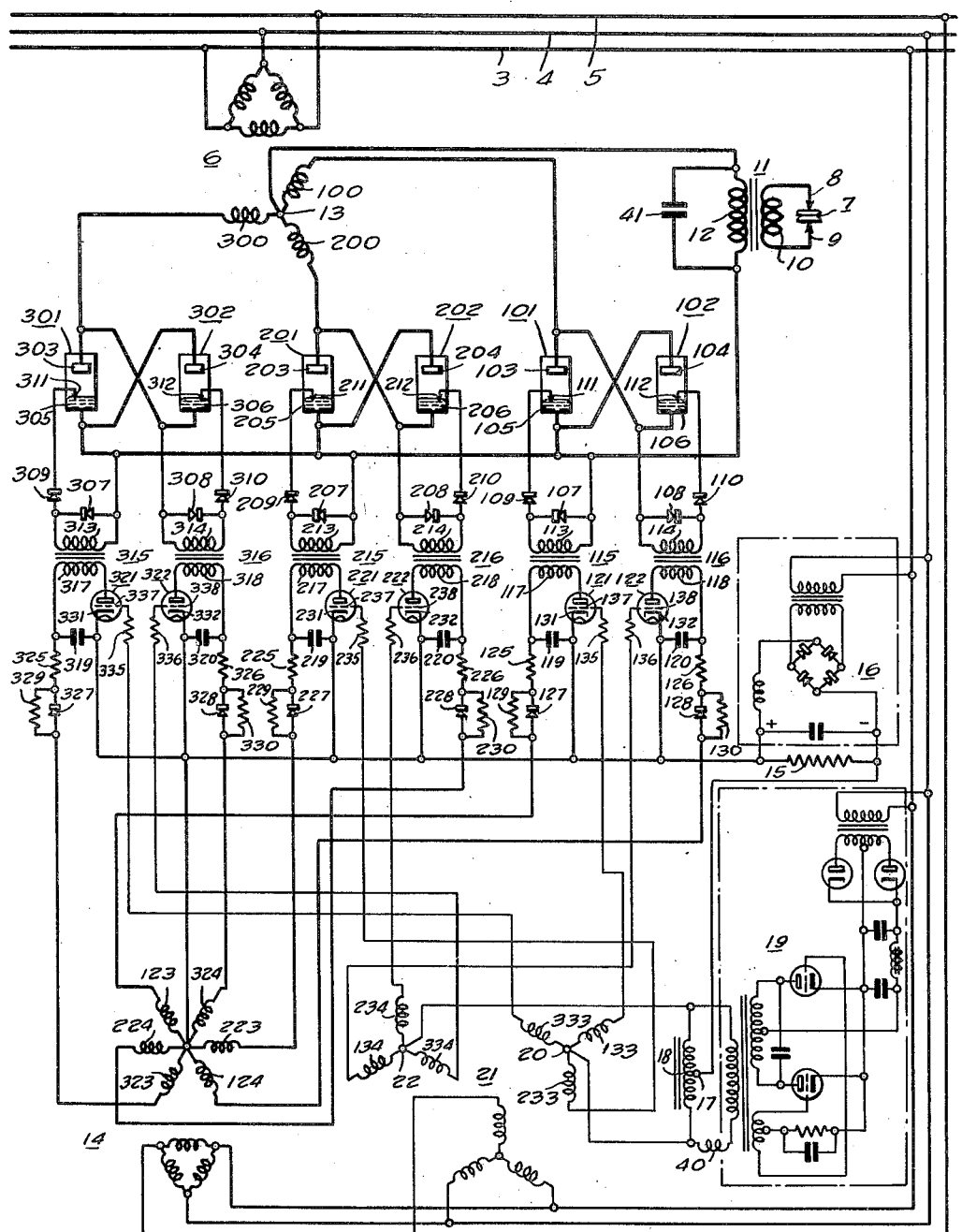
Figure 1 is a circuit diagram of a control system embodying our invention.

As shown in Fig. 1, power is obtained from the three-phase supply lines 3, 4 and 5 through a supply transformer 6. The material 7 to be welded is engaged between two electrodes 8 and 9 connected across opposite ends of the secondary winding 10 of the welding transformer 11 with one end of the primary winding 12 being connected to the center point 13 of the star-connected secondary windings 100, 200 and 300 of the supply transformer 6. Each of these secondary windings, of course, is for a different phase voltage and for convenience in following the diagram, all elements and circuits relating directly to the phase voltage of the first secondary winding 100 bear reference numbers from 100 to 200; all elements and circuits directly relating to the phase voltage of the second secondary winding 200 bear reference numbers from 200 to 300; and all elements and circuits relating directly to the phase voltage of the third secondary winding 300 bear reference numbers from 300 to 400. In addition, those elements and circuits relating to the supply of current in one direction through the primary winding 12 of the welding transformer 11 bear odd reference numbers, while those relating to the supply of current in the opposite direction bear even reference numbers.

The outer end of the first secondary winding 100 is connected to the other end of the primary winding 12 of the welding transformer 11 through a pair of inversely-connected unidirectional main valves 101 and 102, preferably discharge valves of the arc-like type such as ignitrons. The second secondary winding 200 is also connected to the other end of the primary winding 12 of the welding transformer 11 through another pair of unidirectional main valves 201 and 202, preferably discharge valves of the arc-like type, and the third secondary winding 300 is likewise connected to the other end of the primary winding 12 through still another pair of unidirectional main valves 301 and 302, preferably discharge valves of the arc-like type.

The anodes 103, 203 and 303 of main valves 101, 201 and 301 are connected respectively to the outer ends of the secondary windings 100, 200 and 300 of the supply transformer 6 while the cathodes 105, 205 and 305 are connected respectively to the primary winding 12 of the welding transformer 11. The anodes 104, 204 and 304 of main valves 102, 202 and 302 are connected respectively to the cathodes 105, 205 and 305 of main valves 101, 201 and 301 while the cathodes 106, 206 and 306 of main valves 102, 202 and 302 are connected respectively to the anodes 103, 203 and 303 of main valves 101, 201 and 301. Thus, it is evident that current in one direction through the primary winding 12 of the welding transformer 11 may only be conducted through main valves 101, 201 and 301, while current in the opposite direction through the primary winding 12 may only be conducted through main valves 102, 202 and 302.

The ignition circuits for the main valves 101, 102, 201, 202, 301 and 302 are similar to each other and each extends from the corresponding one of cathodes 105, 106, 205, 206, 305 and 306 through a corresponding pair of series-connected rectifier units 107 and 109, 108 and 110, 207 and 209, 208 and 210, 307 and 309, 308 and 310, preferably of the dry type, to the corresponding ignition electrodes 111, 112, 211, 212, 311 and 312. A corresponding secondary winding 113, 114, 213, 214, 313 and 314 of a corresponding ignition transformer 115, 116, 215, 216, 315 and 316 is connected to supply voltage between the junction point intermediate the corresponding pair of rectifier units and the corresponding cathode.

The primary windings 117, 118, 217, 218, 317 and 318 of the ignition transformers are each connected across an individual firing capacitor 119, 120, 219, 220, 319 and 320 through a corresponding electric discharge valve 121, 122, 221, 222, 321 and 322, preferably of the arc-like type such as a thyratron, hereinafter designated the firing valve. The individual firing capacitors 119, 120, 219, 220, 319 and 320 are connected to be charged from the supply lines 3, 4 and 5 through a charging transformer having six-phase star-connected secondary windings 123, 124, 223, 224, 323 and 324. Each of the six secondary windings of the charging transformer 14 corresponds to an individual firing capacitor and is connected thereacross to charge that capacitor through a corresponding current limiting resistor 125, 126, 225, 226, 325 and 326 and a corresponding rectifier 127, 128, 227, 327 and 328 shunted by a high resistance resistor 129, 130, 229, 230, 329 and 330. The phase relations of the voltages across the secondary windings of the charging transformer 14 with respect to the phase voltages of the supply transformer 6 are such that charging of a firing capacitor is initiated approximately 60 electrical degrees ahead of the supply phase voltage for the main valve associated with that capacitor. As will appear later, this enables the firing capacitor to be fully charged prior to the instant of ignition of the corresponding main valve.

The control circuits of the firing valve 121, 122, 221, 222, 321 and 322 are similar to each other and each extends from the corresponding cathode 131, 132, 231, 232, 331 and 332 through a resistor 15 across which a negative biasing voltage is impressed by means of a rectifier unit 16 energized from the supply lines 3, 4 and 5. The control circuit continues from the resistor 15 to an intermediate tap 17 on a saturating reactor 18 across the outer terminals of which is impressed the output of a square-wave voltage generator 19 through a linear reactor 40. The generator 19 is arranged so that the frequency of the square-wave voltage output corresponds to the frequency of the single-phase current to be supplied through the primary winding 12 of the welding transformer 11.

From the intermediate tap 17 on the saturating reactor 18, the control circuits of the firing valves then separate from each other. The control circuits of firing valves 121, 221 and 321 extend from the lower end of the saturating reactor 18 to the center point 20 of three star-connected secondary windings 133, 233 and 333 of a control transformer 21 energized from the supply lines 3, 4 and 5. These three secondary windings correspond to the three firing valves 121, 221 and 321, and the control circuit for each of these firing valves continues from the center point 20 through the corresponding secondary winding and a grid resistor 135, 235 and 335 to the associated control grid 137, 237 and 337.

The control circuits of firing valves 122, 222 and 322 continue from the center tap 17 of the saturating reactor 18 through the upper terminal thereof to the center point 22 of another set of three star-connected secondary windings 134, 234 and 334 of the control transformer 21. These three secondary windings correspond to the three firing valves 122, 222 and 322. The control circuit of each of these three firing valves then continues from the center point 22 through the corresponding secondary winding and a grid resistor 136, 236 and 336 to the associated grid 138, 238 and 338.

It is apparent that the control circuit of each firing valve has impressed therein a negative biasing voltage through resistor 15 on which is superimposed a square-wave voltage through reactor 18, the square-wave voltage on the control circuits of firing valves 121, 221 and 321 being 180° out of phase with the square-wave voltage for valves 122, 222 and 322. In addition, each control circuit has impressed therein a voltage as developed across the corresponding winding of the secondaries of the control transformer 21. It is to be noted that the voltage of each secondary winding of the control transformer 21 preferably is approximately 30° behind the phase voltage for the corresponding main valve. The magnitudes of the biasing voltage, the square-wave voltage and the control transformer voltage are selected so that during the negative half-period of the square-wave voltage as referred to the control grid in a control circuit, the resultant voltage does not become more positive than the critical voltage which is necessary to render the corresponding firing valve conductive. On the other hand, during the positive half period of the square-wave voltage, the resultant voltage becomes more positive than the critical value to render the corresponding firing valve conductive at an instant approximately 30° behind the phase voltage for the corresponding main valve.

When a firing valve is rendered conductive, the corresponding firing capacitor discharges through the firing valve and the associated primary winding of the ignition transformer to supply an impulse of current through the ignition electrode of the corresponding main valve to render it conductive if a positive voltage exists across that main valve, that is, if at that instant the anode of the main valve is positive with respect to the cathode by an amount equal to or greater than the value necessary to permit initiation of and to maintain conduction of current therethrough.

The operation of the circuit of Fig. 1 proceeds as follows: While the square-wave voltage across the saturating reactor 18 is of such polarity that the lower terminal thereof is positive, firing valves 121, 221 and 321 are rendered conductive in succession, each at an instant approximately 30° after the initiation of a positive half-period of the phase voltage supplied from the corresponding secondary windings 100, 200 or 300 of the supply transformer 6 to the corresponding main valve 101, 201 or 301. It follows that the main valves 101, 201 and 301 are then rendered conductive in succession with each becoming conductive approximately when the corresponding phase voltage for that main valve becomes more positive than the other phase voltages. Consequently, current flows in one direction from the outer ends of the secondary windings 100, 200 and 300 of the supply transformer 6 through main valves 101, 201 and 301 and the primary winding 12 of the welding transformer 11. This operation will be continued until the square-wave voltage across the saturating reactor 18 is changed.

When the polarity of the square-wave voltage is changed so that the upper terminal of the saturating reactor 18 becomes positive, one of the main valves 101, 201 and 301 will be conductive at that instant. Let it be assumed that the change in the polarity of the square-wave voltage occurs shortly after the main valve 101 is rendered conductive. Thereafter, at the instant determined by the phase relation of the secondary winding 334 of the control transformer 21, the firing valve 322 is rendered conductive. Ignition current then flows through the ignition electrode 312 of the main valve 302, but this main valve does not become conductive because the anode 304 thereof is less positive than the anode 103 of the conductive main valve 101 since anode 304 is connected directly to the cathode 105 of conductive main valve 101.

Thereafter, the secondary winding 233 of the control transformer 21 tends to make the grid 237 of the firing valve 221 positive. However, since the polarity of the square-wave voltage is negative with respect to the grid 237 in the control circuit of this firing valve 221, the grid 237 does not become sufficiently positive to render the firing valve 221 conductive.

The primary winding 12 represents an inductance in the circuit and magnetic energy is stored therein which is released as the phase voltage for conductive main valve 101 decreases and drops to zero. A capacitor 41 is connected across the primary winding 12 because of this fact. This capacitor 41 obviously has a charge thereon of one polarity when the phase voltage for conductive valve 101 starts to drop. The capacitor then tends to supply current through the primary winding 12 until discharged and then absorbs the stored energy released by the primary winding, permitting the conductive main valve 101 to become non-conductive when the phase voltage drops to zero or shortly thereafter as the phase voltage becomes negative. The capacitor also serves to improve the wave form of the primary winding current.

Approximately 30 degrees after the phase voltage for main valve 101 becomes negative, the secondary winding 134 of the control transformer 21 causes the firing valve 122 to become conductive. As a result, ignition current is supplied through the ignition electrode 112 of main valve 102. If the main valve 101 has become non-conductive by this time, main valve 102 becomes conductive to supply current in the opposite direction through primary winding 12 and main valves 202 and 302 become conductive in succession to continue such current until the polarity of the square-wave voltage changes again.

If the main valve 101 has not become non-conductive by the time ignition current is supplied to main valve 102, that valve does not become conductive as a positive voltage does not exist thereacross. The secondary winding 333 of the control transformer 21 next tends to render the firing valve 321 conductive, but is unsuccessful since the square-wave voltage is negative with respect to the grid 337 of this firing valve.

By this time, the energy previously stored in the welding transformer has been consumed in charging capacitor 41 and maintaining the flow of current through the circuit including the conductive main valve 101 while the phase voltage across secondary winding 100 was negative so that main valve 101 becomes non-conductive. Thereafter, firing valves 222, 322 and 122 are rendered conductive in succession to render the main valves 202, 302 and 102 conductive in succession to effect a supply of current through the primary winding 12 of the welding transformer 11 in the opposite direction.

It then becomes apparent that, in effect, a single-phase current is supplied through the primary winding 12 of the welding transformer 11 at a frequency determined by the frequency of the output of the square-wave voltage generator 19. It is to be noted that the magnitude of the average current supplied through the primary winding 12 of the welding transformer 11 may be decreased by readjustment of the phase relationships of the voltages of the secondary windings of the control transformer 21 with respect to the supply voltages to effect a delayed ignition of the main valves.

It is to be noted that if the inductance represented by the primary winding 12 is of such nature that when the square-wave voltage changes, the current through the primary winding 12 would drop to zero during the succeeding negative half-period of the phase voltage of the conductive main valve without the capacitor 41, then the capacitor may be omitted. In either case, it is to be noted the energy stored in the inductance represented by the primary winding 12 is not wasted but is returned to the supply transformer either in maintaining current flow through the conductive valve while the phase voltage is negative, or, when the capacitor is used, in the subsequent discharge of the energy previously absorbed therein upon the release of the stored energy of the inductance, when the current supply through the primary winding is reversed.

Figure 2:
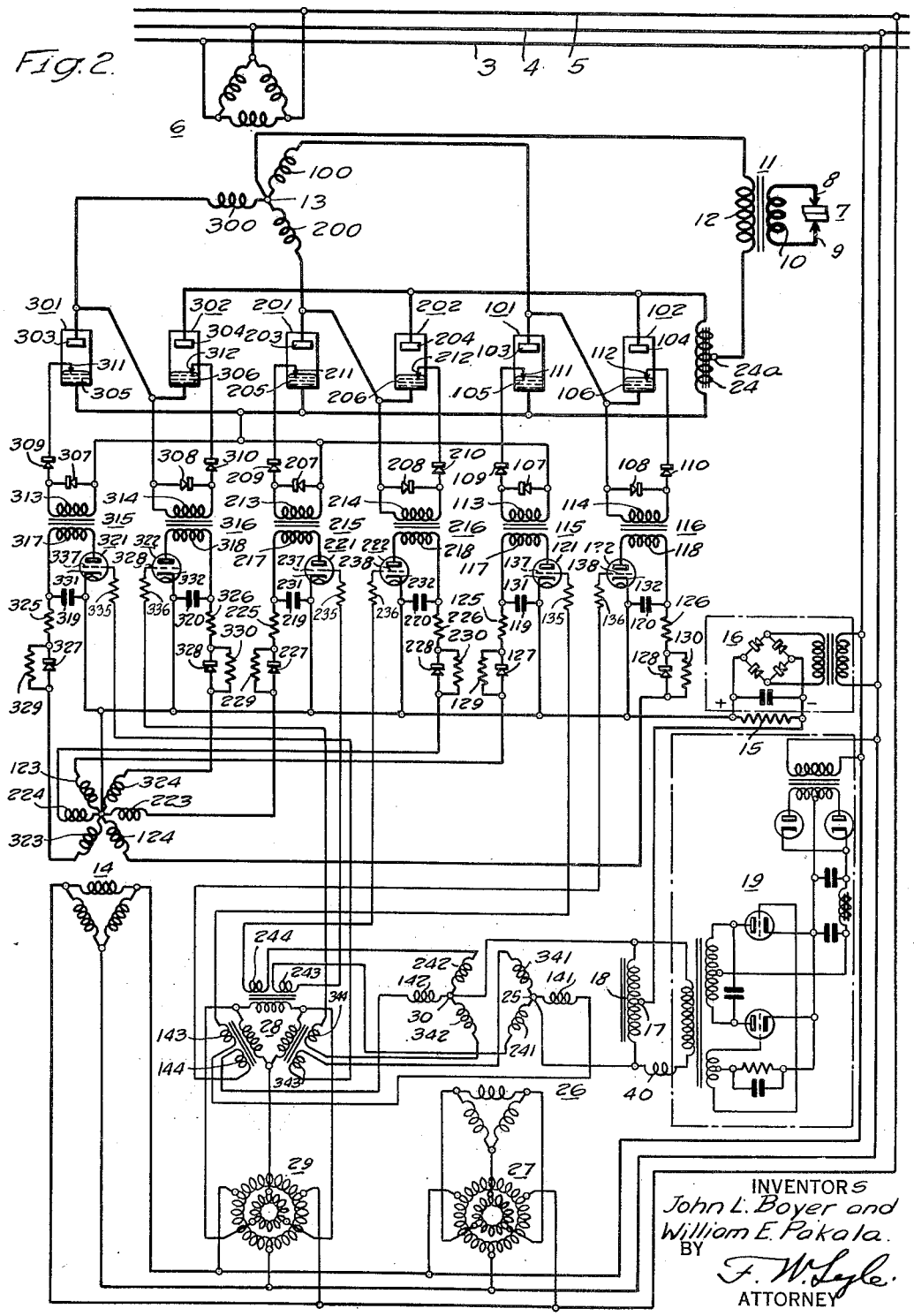
Fig. 2 is a circuit diagram of a preferred modification of the apparatus of Fig. 1.

Another way of taking care of the stored energy is shown in the circuit of Fig. 2 which is somewhat similar to that of Fig. 1 with the same reference numbers applied to corresponding elements. The load supply circuit of Fig. 2 differs from that of Fig. 1 in that the anodes 104, 204 and 304 of main valves 102, 202 and 302 are connected to the cathodes of valves 101, 201 and 301 respectively through a paralleling reactor 24 instead of being directly connected as in Fig. 1. The center tap 24a of the paralleling reactor 24 is then connected to the primary winding 12 of the welding transformer 11.

The control arrangement for the main valves in Fig. 2 is similar to that shown in Fig. 1, but differs in the details of the control circuits of the firing valves 121, 122, 221, 222, 321 and 322. The control circuits of each firing valve extends from the corresponding cathode 131, 132, 231, 232, 331 and 332 through the resistor 15 across which the biasing potential appears to the center tap 17 of the saturating reactor 18 which is energized from the square-wave voltage generator 19. The control circuits for firing valves 121, 221 and 321 continue from the lower terminal of the saturating reactor 18 to the center point 25 of three star-connected secondary windings 141, 241 and 341 of a first control transformer 26 of the peaking type energized from the supply lines 3, 4 and 5 through a first phase shifting unit 27. The three secondary windings 141, 241 and 341 correspond to the three firing valves 121, 221 and 321 respectively and the control circuit of each of these firing valves extends from the center point 25 through the corresponding one of secondary windings 141, 241 and 341 and a corresponding one of secondary windings 143, 243 and 343 on a second control transformer 28 of the peaking type energized from the supply lines 3, 4 and 5 through a second phase shifting unit 29, and through a corresponding grid resistor 135, 235 and 335 to the corresponding grid 137, 237 and 337. The control circuits for firing valves 122, 222 and 322 continue from the upper terminal of the saturating reactor 18 to the center 30 of three other star-connected secondary windings 142, 242 and 342 of the first control transformer 26. These three secondary windings 142, 242 and 342 correspond to the three firing valves 122, 222 and 322 respectively and the control circuit of each of these firing valves extends from the center 30 through the corresponding one of secondary windings 144, 244 and 344 on the second control transformer 28 and then through a corresponding grid resistor 136, 236 and 336 to the corresponding grid 138, 238 and 338.

The secondary windings of the first and second control transformers 26 and 28 are so arranged and the phase shifting units are so adjusted that a first voltage impulse is impressed in the control circuit of each firing valve by the first control transformer making the grid thereof more positive at an instant approximately 30° after the initiation of a positive half-period of the corresponding phase voltage of the supply transformer for the corresponding main valve and a second voltage impulse is impressed in the control circuit of each firing valve by the second control transformer making the grid thereof more positive at an instant immediately after the supply phase voltage for the corresponding main valve passes from positive to negative. In other words, the first control transformer provides a first voltage impulse for each firing valve tending to render it conductive approximately when the phase voltage for the corresponding main valve becomes more positive than the other phase voltages and the second control transformer provides a second voltage impulse for each firing valve tending to render it conductive approximately when the phase voltage for the corresponding main valve changes from positive to negative polarity.

It is to be noted that the magnitude of the first voltage impulse provided by the first control transformer 26 is considerably less than that of the second impulse provided by the second control transformer 28. The magnitudes of these impulses as well as of the biasing voltage across resistor 15 and the square-wave voltage from reactor 18 in each control circuit are selected so that while the square-wave voltage is in a positive half period with respect to the grid of the firing valve in a control circuit, the resultant voltage in the control circuit becomes more positive than the critical value necessary to render the firing valve conductive at the instants of occurrence of both the first and second voltage impulses. On the other hand, when the square-wave voltage is in a negative half-period, the resultant voltage becomes more positive than the critical value only at the instant of occurrence of the second voltage impulse. The timing of the impulses is arranged to provide a smooth, faultless commutation or period of changeover of the supply of current through the primary winding 12 from one direction to the other as will appear hereinafter.

The operation of the circuit of Fig. 2 is as follows: While the lower terminal of the saturating reactor 18 is positive, let it be assumed that main valve 101 is first rendered conductive approximately 30 degrees after the corresponding phase voltage becomes positive with respect thereto to supply current in one direction through the primary winding 12. Thereafter, the phase voltage for main valve 301 passes from positive to negative and the second control transformer 28 provides a voltage impulse on the grid of firing valve 321 tending to render that firing valve conductive. If main valve 301 has been conductive just prior to main valve 101 it is probable that capacitor 319 is not charged sufficiently to permit the firing valve 321 to become conductive. However, in any event it is apparent that the anode 303 of main valve 301 is less positive than the anode 103 of conductive main valve 101 at this time so that main valve 301 does not become conductive.

Approximately 30 degrees later, the first control transformer 26 provides a voltage impulse on the grid of firing valve 322. Since the square-wave voltage on reactor 18 is negative with respect to the grid of firing valve 322, the impulse is not sufficient to render the firing valve conductive.

As the phase voltage for main valve 202 thereafter passes from positive to negative the second control transformer impresses a voltage impulse on the grid of firing valve 222 sufficient to render it conductive even though the square-wave voltage on reactor 18 is negative with respect thereto. At this time it will be noted the sum of the voltages across secondary windings 100 and 200 is such that with main valve 101 already conductive, a positive voltage exists across main valve 202 so that it also becomes conductive. Thus, at this time, main valves 101 and 202 are conductive simultaneously. In the absence of paralleling reactor 24 such a situation would establish a short circuit across the two secondary windings 100 and 200 and the current therethrough would soar resulting in loss of control and possibly injury to the main valves. The reactor 24 has a high impedance relative to that of any two secondary windings of the supply transformer and serves to prevent such a short circuiting and to limit the current while both main valves 101 and 202 are conductive simultaneously. It is to be noted that the reactor 24 may comprise two windings on separate cores or a single winding with a center tap as illustrated. In any case a high impedance is desired across the entire reactor to limit the current while two main valves are conductive but with a low impedance across one half of the reactor when but one main valve is conductive. To meet these conditions, we prefer a single winding with a center tap or two closely coupled windings on the same core.

The period of simultaneous conductivity of main valves 101 and 202 lasts but a short while until the sum of the voltages across secondary windings 100 and 200 is insufficient to maintain main valve 202 conductive. About the same time the first transformer 26 provides an impulse which is sufficient with the square-wave voltage on reactor 18 to render firing valve 221 conductive and so main valve 201 becomes conductive to take over from valve 101 the supply of current in the same direction through the primary winding 12.

Thereafter impulses are provided by the second control transformer on firing valve 121 for main valve 101 and then by the second control transformer on firing valve 122 for main valve 102. However, main valves 101 and 102 are not rendered conductive by these impulses for the reasons set forth in connection with main valves 301 and 302 while main valve 101 was conductive.

Next, the second control transformer 28 impresses a voltage impulse on the grid of firing valve 322 as the phase voltage for the corresponding main valve 302 passes from positive to negative. Main valve 302 then becomes conductive while main valve 201 is still conductive. Shortly thereafter main valve 301 is rendered conductive to take over from main valve 201 the supply of current in the same direction through the primary winding 12.

Subsequently main valve 102 becomes conductive while main valve 301 is still conductive and then main valve 101 takes over from valve 301. Thus, the main valves 101, 201 and 301 continue to become conductive in succession to supply current in one direction through the primary winding 12 until the polarity of the square-wave voltage on reactor 18 changes.

When the square-wave voltage on reactor 18 changes, the main valves which previously operated as rectifiers to supply current to the primary winding 12 of the welding transformer, that is, valves 101, 201 and 301 in the situation just discussed, now operate as inverters until the current through the primary winding drops substantially to zero. This may be appreciated from a concrete example where it is assumed that the polarity of the square-wave voltage on the saturating reactor 18 is changed shortly after the main valve 101 is rendered conductive. In following the order of peaked voltage impulses impressed in the control circuits from both the first and second control transformers 26 and 28, it is seen that the second control transformer 28 first impresses an impulse on the grid of firing valve 321 for main valve 301. However, the anode 303 of main valve 301 is considerably less positive at this instant than the anode 103 of conductive valve 101 so that main valve 301 does not become conductive.

The first control transformer 26 next provides a peaked impulse to render firing valve 322 conductive. However, current is still flowing through valve 101 from the secondary winding 100 so that the anode 304 of main valve 302 is less positive than that of main valve 101 and valve 302 does not become conductive.

Thereafter, the second control transformer 28 provides a voltage impulse rendering the firing valve 222 conductive. This occurs at the instant the corresponding phase voltage of main valve 202 is passing from positive to negative and causes valve 202 to become conductive. Main valves 202 and 101 are conductive simultaneously for a very short time when valve 202 becomes non-conductive while valve 101 continues to conduct. The succeeding impulse supplied in the control circuit of firing valve 221 by the first control transformer 26 is insufficient to render that firing valve conductive as the lower terminal of the reactor 18 is now negative.

The firing valve 121 next receives an impulse from the second control transformer 28, but it is noted that capacitor 119 is not charged sufficiently for firing valve 121 to conduct and the corresponding main valve 101 is already conductive anyhow. Thereafter, the voltage impulse of the first control transformer 26 renders firing valve 122 conductive. However, main valve 101 is still conducting current supplied by the release of energy previously stored in the primary winding 12 of the welding transformer. Since the cathode of main valve 102 corresponding to firing valve 122 is connected to the anode of main valve 101, main valve 102 does not become conductive.

The subsequent impulse of the second control transformer 28 in the control circuit of the firing valve 322 does not render main valve 302 conductive as the voltage thereacross is negative at that time. The succeeding impulse in the control circuit of firing valve 321 from the first control transformer does not render that firing valve conductive because the square-wave voltage is negative with respect thereto. As the phase voltage corresponding to main valve 201 is passing from positive to negative the second control transformer tends to render that valve conductive. At that same instant, the phase voltage corresponding to conductive valve 101 is highly negative, the valve 101 remaining conductive because of the voltage generated across the primary winding 12 by the release of previously stored energy. Consequently, valve 201 has a more positive voltage thereacross and is rendered conductive while valve 101 becomes non-conductive.

This procedure continues with main valve 201 acting as an inverter to be followed by main valve 301 acting as an inverter and so on until the current generated by the primary winding 12 of the transformer 6 drops to zero. Thereafter, valves 102, 202 and 302 are rendered conductive as rectifiers in succession at the instant when each corresponding phase voltage becomes more positive than the other phase voltages to supply current in the opposite direction through the primary winding 12. Of course main valves 201, 301 and 101 are rendered conductive for a short time near the end of each period of conduction of main valves 102, 202 and 302, respectively. When the square-wave voltage is subsequently changed, valves 102, 202 and 302 act as inverters until the current in primary winding 12 drops to zero and valves 101, 201 and 301 take over to supply current in the first direction again through the primary winding. Thus, current of a low frequency relative to that of the supply voltage is supplied through the primary winding 12 with the frequency determined by the frequency of the square-wave voltage on reactor 18.

While we have shown and described specific embodiments of our invention, we are aware that many other modifications thereof may be made without departing from the spirit of the invention. We do not intend, therefore, to limit our invention to the specific embodiments disclosed.

We claim as our invention:

1. Apparatus for supplying power from a source of polyphase alternating voltage to a single phase load, comprising, in combination, a pair of unidirectional electric discharge valves for each phase of said source, each pair of valves being connected in inverse parallel-circuit relation with each other and in series with the corresponding phase of said source and said load, whereby load current in one direction may be conducted only through a first valve of each pair and load current in the opposite direction may be conducted only through a second valve of each pair, timing means for causing a control current to flow in one direction during a first time interval and to flow in the other direction during a second time interval, and control electrodes in said valves and responsive to said timing means in accordance with the direction of said control current flow caused by said timing means for causing said first valves to be conductive to effect a load current in said one direction during a first time period and said second valves to be conductive to effect a load current in the opposite direction during a second time period following said first time period, the length of said first and second time periods being determined by the length of said first and second time intervals, respectively.

2. Apparatus for supplying power from a source of polyphase alternating voltage to a single phase load, comprising, in combination, a pair of unidirectional electric discharge valves for each phase of said source, each pair of valves being connected in inverse parallel-circuit relation with each other and in series with the corresponding phase of said source and said load, whereby load current in one direction may be conducted only through a first valve of each pair and load current in the opposite direction may be conducted only through a second valve of each pair, timing means for producing a square-wave voltage of a frequency substantially lower than that of said alternating voltage, and control electrodes in said valves and responsive to said square-wave voltage for causing said first valves to be conductive to effect a load current in said one direction during a first time interval and said second valves to be conductive to effect a load current in said opposite direction during a second time interval following said first intervals, the lengths of said intervals being determined by the frequency of said square-wave voltage.

3. Apparatus for supplying power from a source of polyphase alternating voltage to a single phase load, comprising, in combination, a pair of electric discharge valves of the arc-like type for each phase of said source, each pair of valves being connected in inverse parallel-circuit relation with each other and in series with the corresponding phase of said source and said load, whereby load current in one direction may be conducted only through a first valve of each pair and load current in the opposite direction may be conducted only through a second valve of each pair, an impedance means timing means for impressing a voltage across said impedance means which varies at the end of successive time intervals, and control electrodes in said valves and responsive to said voltage for rendering each of said first valves conductive in each half-period of the corresponding phase voltage in which a positive voltage exists across that first valve during alternate ones of said intervals and each of said second valves conductive in each half period of the corresponding phase voltage in which a positive voltage exists across that second valve during the other ones of said intervals.

4. Apparatus for supplying power from a source of polyphase alternating voltage to a single phase load, comprising, in combination, a pair of electric discharge valve of the arc-like type for each phase of said source, each pair of valves being connected in inverse parallel-circuit relation with each other and in series with the corresponding phase of said source and said load, whereby load current in one direction may be conducted only through a first valve of each pair and load current in the opposite direction may be conducted only through a second valve of each pair, timing means for producing a square-wave voltage of a frequency substantially lower than that of said alternating voltage, and control electrodes in said valves and responsive to said square-wave voltage, said control means being responsive to half periods of said square-wave voltage of one polarity to render each of said first valves conductive in each half-period of the corresponding phase voltage in which a positive voltage exists across that first valve and responsive to half-periods of the opposite polarity to render each of said second valves conductive in each half-period of the corresponding phase voltage in which a positive voltage exists across that second valve.

5. Apparatus for supplying power from a source of polyphase alternating voltage to a single phase inductive load, comprising, in combination, a pair of electric discharge valves of the arc-like type for each phase of said source, each pair of valves being connected in inverse parallel-circuit relation with each other and in series with the corresponding phase of said source and said load, whereby load current in one direction may be conducted only through a first valve of each pair and load current in the opposite direction may be conducted only through a second valve of each pair, an impedance means, timing means for impressing a voltage across said impedance means which varies at the end of successive time intervals, control electrodes in said valves and responsive to said voltage for rendering each of said first valves conductive in each half-period of the corresponding phase voltage in which a positive voltage exists across that first valve during alternate ones of said intervals and each of said second valves conductive in each half-period of the corresponding phase voltage in which a positive voltage exists across that second valve during the other ones of said intervals, and a capacitor connected in shunt across said load to absorb stored energy released by the load at the end of each interval.

6. Apparatus for supplying power from polyphase alternating voltage supply lines to a single phase inductive load, comprising, in combination, a polyphase transformer adapted to be energized from said supply lines and having a plurality of star-connected secondary windings, a first discharge valve of the arc-like type for each secondary winding having an anode and cathode with the anode connected to the outer end of the corresponding secondary winding, a second discharge valve of the arc-like type for each secondary winding having an anode and cathode with the cathode connected to the anode of the first valve for the corresponding secondary winding, an impedance member having two sections connected between the cathodes of said first valves and the anodes of the second valves, means adapted to connect said load from the center of said star-connected secondary windings to a point intermediate said two impedance sections, and control means for rendering conductive each of said first valves only in each positive half-period and each of said second valves only in each negative half-period of voltage across the corresponding secondary winding during a first predetermined time interval and each of said first valves only in each negative half-period and each of said second valves only in each positive half-period of voltage across the corresponding secondary winding in which the voltage across the valve is positive during a second immediately succeeding predetermined time interval.

7. Apparatus for supplying power from polyphase alternating voltage supply lines to a single phase inductive load, comprising, in combination, a polyphase transformer adapted to be energized from said supply lines and having a plurality of star-connected secondary windings, a first discharge valve of the arc-like type for each secondary winding having an anode and cathode with the anode connected to the outer end of the corresponding secondary winding, a second discharge valve of the arc-like type for each secondary winding having an anode and cathode with the cathode connected to the anode of the first valve for the corresponding secondary winding, a reactor connected between the cathodes of said first valves and the anodes of the second valves, means adapted to connect said load from the center of said star-connected secondary windings to an intermediate point on said reactor, and control means for rendering conductive each of said first valves only in each positive half-period and each of said second valves only in each negative half-period of voltage across the corresponding secondary winding during a first predetermined time interval and each of said first valves only in each negative half-period and each of said second valves only in each positive half-period of voltage across the corresponding secondary winding in which the voltage across the valve is positive during a second immediately succeeding predetermined time interval.

8. Apparatus for supplying power from polyphase alternating voltage supply lines to a single phase inductive load, comprising, in combination, a polyphase transformer adapted to be energized from said supply lines and having a plurality of star-connected secondary windings, a first discharge valve of the arc-like type for each secondary winding having an anode and cathode with the anode connected to the outer end of the corresponding secondary winding, a second discharge valve of the arc-like type for each secondary winding having an anode and cathode with the cathode connected to the anode of the first valve for the corresponding secondary winding, an iron core reactor having two sections on a single core connected between the cathodes of said first valves and the anodes of the second valves, means adapted to connect said load from the center of said star-connected secondary windings to a point intermediate said two sections, and control means for rendering conductive each of said first valves only in each positive half-period and each of said second valves only in each negative half-period of voltage across the corresponding secondary winding during a first predetermined time interval and each of said first valves only in each negative half-period and each of said second valves only in each positive half-period of voltage across the corresponding secondary winding in which the voltage across the valve is positive during a second immediately succeeding predetermined time interval.

9. Apparatus for supplying power from polyphase alternating voltage supply lines to a single phase inductive load, comprising in combination, a polyphase transformer adapted to be energized from said supply lines and having a plurality of star-connected secondary windings, a first discharge valve of the arc-like type for each secondary winding having an anode and cathode with the anode connected to the outer end of the corresponding secondary winding, a second discharge valve of the arc-like type for each secondary winding having an anode and cathode with the cathode connected to the anode of the first valve for the corresponding secondary winding, an impedance member having two sections connected between the cathodes of said first valves and the anodes of the second valves, means adapted to connect said load from the center of said star-connected secondary windings to a point intermediate said two impedance sections, timing means for indicating a series of successive time intervals, and control means responsive to said timing means for rendering conductive each of said first valves only in each positive half-period and each of said second valves only in each negative half-period of voltage across the corresponding secondary winding in which the voltage across the valve is positive during alternate ones of said time intervals and rendering conductive each of said first valves only in each negative half-period and each of said second valves only in each positive half-period of voltage across the corresponding secondary winding in which the voltage across the valve is positive during the other ones of said intervals.

10. Apparatus for supplying power from a source of polyphase alternating voltage to a single phase load, comprising, in combination, a pair of ignitrons for each phase of said source, the ignitrons of each pair being connected in inverse parallel-circuit relation with each other and in series with the corresponding phase of said source and said load, whereby load current in one direction may be conducted only through a first ignitron of each pair and load current in the opposite direction may be conducted only through a second ignitron of each pair, an auxiliary valve associated with each of said ignitrons and a control means connected to and individual to each of said auxiliary valves, each of said control means operating independently of the other of said control means for causing said auxiliary valves to cause said first ignitrons to be conductive in succession to effect a load current in said one direction during a predetermined first time interval and said second ignitrons to be conductive in succession to effect a load current in said opposite direction during a predetermined second time interval following said first interval, said time intervals being determinable independently of the period of said source and being of longer duration than a period of said source.

11. Apparatus for supplying power from a source of polyphase alternating voltage to a single phase load, comprising in combination, a pair of main electric discharge valves of the arc-like type for each phase of said source, the valves of each pair being connected in inverse parallel circuit relation with each other and in series with the corresponding phase of said source and said load, whereby load current in one direction may be conducted only through a first valve of each pair and load current in the opposite direction may be conducted only through a second valve of each pair, an auxiliary valve associated with each of said main valves and a control means connected to and individual to each of said auxiliary valves for controlling said auxiliary valve, each of said control means operating independently of the other of said control means for causing said auxiliary valves to render said first main valves conductive in succession to effect a load current in said one direction during a predetermined first time interval and said second main valves conductive in succession to effect a load current in said opposite direction during a predetermined second time interval following said first interval, said time intervals being determinable independently of the period of said source and being of longer duration than a period of said source.

12. Apparatus for supplying power from a source of polyphase alternating voltage to a single phase load, comprising, in combination, a pair of ignitrons for each phase of said source, the ignitrons of each pair being connected in inverse parallel-circuit relation with each other and in series with the corresponding phase of said source and said load, whereby load current in one direction may be conducted only through a first ignitron of each pair and load current in the opposite direction may be conducted only through a second ignitron of each pair, an auxiliary valve associated with each of said ignitrons, and a purely electrical control means connected to and individual to each of said auxiliary valves for controlling said auxiliary valves, each of said control means operating independently of the other of said control means to cause said auxiliary valves to cause said first ignitrons to be conductive in succession to effect a load current in said one direction during a predetermined first time interval and said second ignitrons to be conductive in succession to effect a load current in said opposite direction during a predetermined second time interval following said first interval, said time intervals being determinable independently of the period of said source and being of longer duration than a period of said source.

JOHN L. BOYER.
WILLIAM E. PAKALA.

REFERENCES CITED

The following references are of record in the file of this patent:

UNITED STATES PATENTS

| Number | Name | Date |
|---|---|---|
| 1,954,661 | Alexanderson et al. | Apr. 10, 1934 |
| 1,957,230 | Sabbah et al. | May 1, 1934 |
| 2,319,524 | Undy | May 18, 1943 |
| 2,337,982 | Rodgers | Dec. 28, 1943 |
| 2,356,859 | Leathers | Aug. 29, 1944 |
| 2,385,214 | Livingston | Sept. 18, 1945 |